United States Patent
Galdo

(10) Patent No.: US 9,268,559 B2
(45) Date of Patent: Feb. 23, 2016

(54) SYSTEM FOR DETECTING CALL STACK TAMPERING

(71) Applicant: INSIDE SECURE, Meyreuil (FR)

(72) Inventor: Florian Galdo, Marseilles (FR)

(73) Assignee: INSIDE SECURE, Meyreuil (FR)

( * ) Notice: Subject to any disclaimer, the term of this patent is extended or adjusted under 35 U.S.C. 154(b) by 0 days.

(21) Appl. No.: 14/417,639

(22) PCT Filed: Jul. 31, 2013

(86) PCT No.: PCT/FR2013/051854
§ 371 (c)(1),
(2) Date: Jan. 27, 2015

(87) PCT Pub. No.: WO2014/023894
PCT Pub. Date: Feb. 13, 2014

(65) Prior Publication Data
US 2015/0220328 A1      Aug. 6, 2015

(30) Foreign Application Priority Data

Aug. 6, 2012   (FR) ..................................... 12 57635

(51) Int. Cl.
| | |
|---|---|
| *G06F 9/44* | (2006.01) |
| *G06F 11/36* | (2006.01) |
| *G11C 29/56* | (2006.01) |
| *G06F 21/52* | (2013.01) |
| *G06F 21/71* | (2013.01) |
| *G06F 12/06* | (2006.01) |

(52) U.S. Cl.
CPC .............. *G06F 8/70* (2013.01); *G06F 11/3688* (2013.01); *G06F 12/06* (2013.01); *G06F 21/52* (2013.01); *G06F 21/71* (2013.01); *G11C 29/56* (2013.01); *G06F 2212/251* (2013.01)

(58) Field of Classification Search
CPC ............................ G06F 11/3688; G11C 29/56
USPC .............................. 717/132, 124; 714/719, 48
See application file for complete search history.

(56) References Cited

U.S. PATENT DOCUMENTS

| | | | |
|---|---|---|---|
| 7,581,089 B1 * | 8/2009 | White ................... | G06F 9/4426 712/242 |
| 7,669,243 B2 | 2/2010 | Conti | |
| 2003/0182572 A1 | 9/2003 | Cowan et al. | |
| 2004/0168078 A1 * | 8/2004 | Brodley ................. | G06F 21/52 713/190 |
| 2005/0198645 A1 * | 9/2005 | Marr ..................... | G06F 21/606 719/310 |

(Continued)

OTHER PUBLICATIONS

Feb. 10, 2015 International Preliminary Report on Patentability issued in International Application No. PCT/FR2013/051854.

(Continued)

*Primary Examiner* — Phillip H Nguyen
(74) *Attorney, Agent, or Firm* — Oliff PLC

(57) ABSTRACT

The invention relates to a method for detecting a subroutine call stack modification, including the steps of, when calling a subroutine, placing a return address at the top of the stack; at the end of the subroutine, using the address at the top of the stack as the return address, and removing the address from the stack; when calling the subroutine, accumulating the return address in a memory location with a first operation; at the end of the subroutine, accumulating the address from the top of the stack in the memory location with a second operation, reciprocal of the first operation; and detecting a change when the content of the memory location is different from its initial value.

16 Claims, 2 Drawing Sheets

(56) References Cited

U.S. PATENT DOCUMENTS

| | | | | |
|---|---|---|---|---|
| 2006/0161739 A1* | 7/2006 | Genty | ................ | G06F 12/1466 711/152 |
| 2009/0038008 A1* | 2/2009 | Pike | ..................... | G06F 21/52 726/22 |
| 2009/0187396 A1* | 7/2009 | Kinno | .................... | G06F 8/20 703/22 |
| 2013/0013965 A1* | 1/2013 | Guillemin | ............... | G06F 21/52 714/48 |

OTHER PUBLICATIONS

Nov. 6, 2013 International Search Report issued in International Application No. PCT/FR2013/051854.

\* cited by examiner

SYSTEM FOR DETECTING CALL STACK TAMPERING

FIELD

The invention relates to the detection of unexpected changes of the contents of a subroutine call stack in a processor system, in particular to detect fraud attempts.

BACKGROUND

A subroutine call stack is a reserved memory area in a processor system for storing a so-called "return" address, i.e. the address at which to continue the execution of a program when the execution of a subroutine ends. The term "stack" reflects a last in-first out (LIFO) management style of the memory area, which is particularly well suited for handling nested subroutines. Common terminology relative to the management of a stack will be used hereinafter, such as "pushing" on the stack and "popping" from the stack, with the understanding that the underlying operations are actually obtained by managing read and write pointers of the memory area.

An unexpected change of the call stack may cause, when the subroutine ends, a program execution jump to an arbitrary location, identified by the changed value in the stack. The change may be due to a fraud attempt where a fraudster seeks to divert execution to a piece of pirate code or to bypass security checks.

A modification of the stack may be achieved by a laser attack, i.e. directing a pulsed laser beam on the stack region of the memory, or on the data bus during a read transaction with the stack. The value conveyed on the bus may also be changed by generating pulses in the power supply voltage during the read transaction.

To better illustrate this problem, consider the following pseudo-code in C language:

```
void main(void)
{
    ...
    func1( );
    ...
}
void func1(void)
{
    ...
    func2( );
    ...
    return;
}
void func2(void)
{
    ...
    func3( );
    ...
    VerifyPIN( );
    ...
    return;
}
void func3(void)
{
    ...
    return;
}
void VerifyPIN(void)
{
    ...
    return;
}
```

FIG. 1 illustrates the execution of this pseudo-code. The content of the call stack is shown above each block illustrating the execution of a subroutine or function. It is assumed that the stack is filled from the bottom in this representation.

During its execution, function main( ) calls function func1( ); the corresponding return address @1 is pushed on the stack, while function func1( ) is executed. Function func1( ) calls a function func2( ); the corresponding return address @2 is pushed on the stack. Function func2( ) calls a function func3( ); a further return address @3 is pushed on the stack.

The end of execution of function func3( ) is identified by the execution of the dedicated "return" instruction. This instruction causes the address @3 to be popped from the stack and execution to continue from that address, in this case the continuation of the execution of function func2( ). Function func2( ) then calls a VerifyPIN( ) function, whose role is, for example, to verify the entry of a PIN code. The corresponding return address @4 is pushed on the stack.

When execution of the VerifyPIN( ) function ends, the address @4 is popped from the stack and execution continues from that address, in this case in function func2( ).

As the functions end their execution, the return addresses are popped from the stack, and execution finally returns to the address @1 within the main( ) function.

In FIG. 2, during the execution of function func3( ), a fraudster changes the last address of the stack @3. The fraudster manages to replace that address by @4, which is the return address of the VerifyPIN( ) function. Thus, when the execution of function func3( ) ends, execution continues at address @4. The VerifyPIN( ) function for verifying the entry of a PIN code is thereby bypassed.

The fraudster does not need to know the exact return address @4 of the function he wants to bypass. He may simply find, by trial and error, an arbitrary address beyond the return address, which does not cause an error following the lack of execution of the code portion located between the return address and the arbitrary address.

Various solutions are known to avoid this type of fraud. For example, U.S. Pat. No. 7,581,089 suggests the use of two redundant call stacks. Each return address is pushed on the two stacks when calling subroutines. At the end of the execution of a subroutine, the system checks that the return address is present in both stacks. Even if a fraudster can change the addresses in both stacks, the chances of success of such changes are random: it is particularly difficult to change both stacks simultaneously in the same way.

Although this solution is effective, it requires additional complexity that increases the circuit surface area and reduces its performance.

SUMMARY

There is therefore a need for a low complexity solution to detect changes to the content of the subroutine call stack.

This need may be addressed by a method for detecting a subroutine call stack modification, comprising the steps of, when calling a subroutine, placing a return address at the top of the stack; at the end of the subroutine, using the address at the top of the stack as the return address, and removing the address from the stack; when calling the subroutine, accumulating the return address in a memory location with a first operation; at the end of the subroutine, accumulating the address from the top of the stack in the memory location with a second operation, reciprocal of the first operation; and detecting a change when the content of the memory location is different from its initial value.

The first and second operations may be a bitwise exclusive-OR.

The first and second operations may be addition and subtraction.

The return address and the address at the top of the stack may be values taken from a memory bus during access transactions to the stack.

The initial value may be random.

A device may be provided for detecting a subroutine call stack modification, comprising, associated with a processor, a memory location storing an initial value, readable and writable by program instructions; an operator configured to replace the value of the memory location by the result of an operation between the content of the memory location and a current value exchanged with the call stack; and a detection circuit configured to identify the currently executed instruction and, if the identified instruction is a subroutine call, configuring the operator to perform a first type of operation, and, if the identified instruction is a subroutine return, configuring the operator to perform a second type of operation, reciprocal of the first type.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 1:
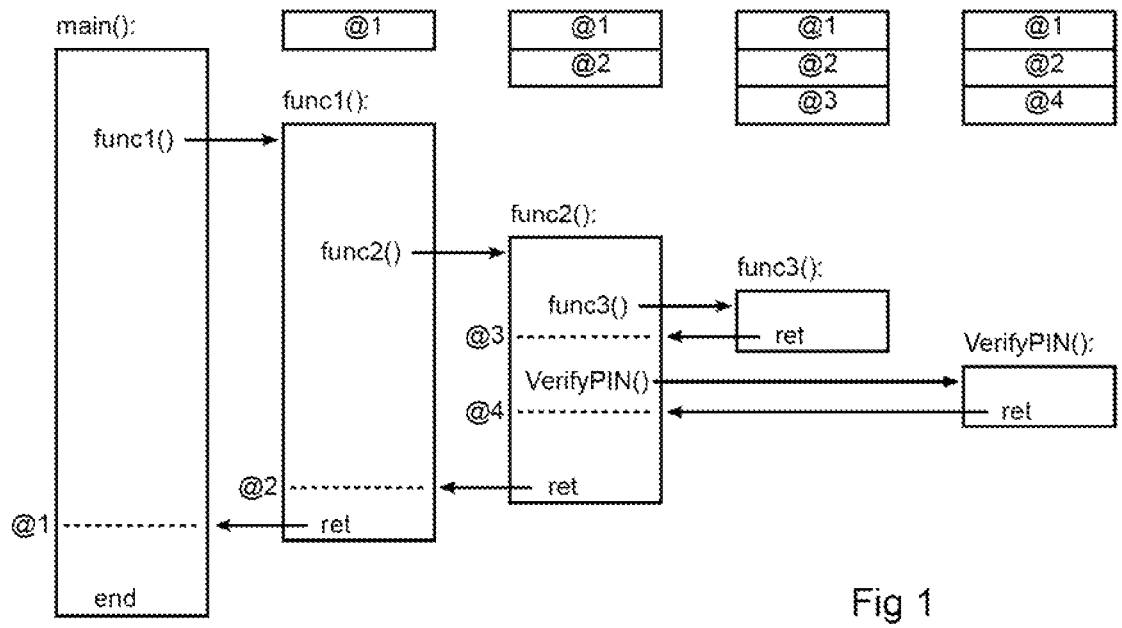
FIG. 1, previously described, illustrates an exemplary pseudo-code execution, showing the evolution of the contents of the call stack.

In FIG. 1, between the call to function func1( ) in program main( ), and the return from function func1( ), the addresses @1, @2, @3 and @4 are pushed on the call stack at the successive function calls. During this same phase, at the successive function returns, the addresses @3, @4, @2 and @1 are popped from the stack.

Note that the pushing and popping sequences include the same addresses. The order of the popping sequence is not necessarily the reverse order of the pushing sequence, as shown by the addresses @3 and @4, because several subroutines may be called in a same function. The property however remains that a same address appears twice on the stack bus, once in write mode, and once in read mode.

In order to detect a change in the call stack, or in the values conveyed on the stack bus, it is proposed to verify, at least for a program portion estimated as critical by the programmer, that each stack address appears twice on the bus between the call to, and the return from the subroutine.

To perform such a check, one solution could be to store the complete sequence of addresses pushed on, and popped from the stack, in order to check in the end that each address is present an even number of times. This solution is inefficient.

It is preferable to use a recursive operation performed at each push and pop for accumulating the successive addresses in a dedicated memory location, for instance a register. The recursive operation may be such that the second operation performed on one address cancels the effect of the first operation performed on the address.

This may be achieved by using two reciprocal operations, one used for each push, and the other used for each pop. The first operation is for example addition, and the second subtraction.

In the example of FIG. 1, and implementing the verification for function func1( ) in the main( ) program, the content accumulated in the register, initialized to a value $REG_0$, would be:

$$REG = REG_0 + @1 + @2 + @3 - @3 + @4 - @4 - @2 - @1$$

$$= REG_0.$$

If everything occurs as expected, the register content is restored to its initial value $REG_0$ upon returning in program main( ).

Figure 2:
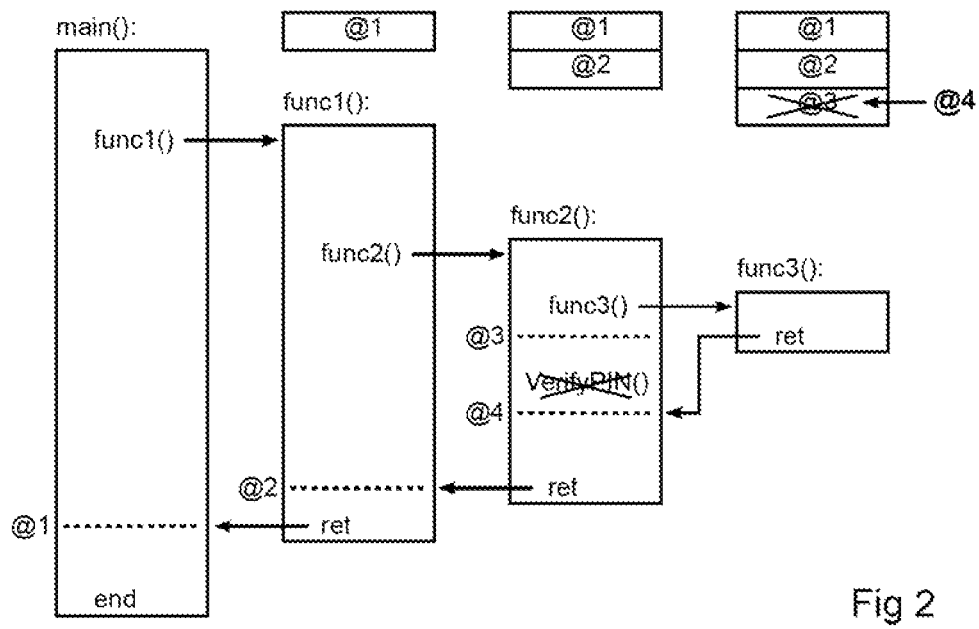
FIG. 2, previously described, illustrates a fraud attempt in the execution example of FIG. 1.

In the example of FIG. 2, the register content would be:

$$REG = REG_0 + @1 + @2 + @3 - @4 - @2 - @1$$

$$= REG_0 + @3 - @4 \neq REG_0.$$

The fact that the register content is different from the initial content upon the return from function func1( ) indicates that an address in the stack was changed.

It may be noted that this procedure "protects" all nested subroutines in function func1( ): it suffices that any return address of these subroutines is changed for causing a failure of the verification.

Alternatively, the first operation may be multiplication, and the second division.

It may however be preferred to use a single operation that is the inverse of itself, for instance the bitwise exclusive-OR operation. This operation also has the feature of being fast and easy to implement in hardware.

The initial value $REG_0$ may be random, and renewed at each call to the function to check. If the initial value were fixed, the fraudster could be tempted to change the contents of the register by laser attack, in order to restore it to its original value when the subroutine return occurs.

It is not necessary to implement such verifications systematically, e.g. for all subroutine calls in program main( ). This could even be ineffective. Indeed, a function useful to the fraudster may be nested several levels beneath program main( ). In this case, the fraud is detected upon return to program main( ), but only after the function useful to the fraudster has been executed.

It is thus desirable that the programmer identifies critical subroutines and individually protects them in an adequate level of nesting. For this purpose, the register REG may be accessible by software, allowing the programmer to insert, before a subroutine call to protect, initialization instructions of the register and, after the return of the subroutine, instructions to read the content of the register and check if it has changed. For example, in FIG. 1, if function func2( ) should be protected (and therefore all functions nested in function func2( )), one could use the following pseudo-code in the definition of function func1( ):

```
void func1(void)
{
    ...
    REG0 := RAND( );
```

-continued

```
        REG := REG₀;
        func2( );
        IF REG <> REG₀ THEN Alert( );
        ...
        return;
}
```

Figure 3:
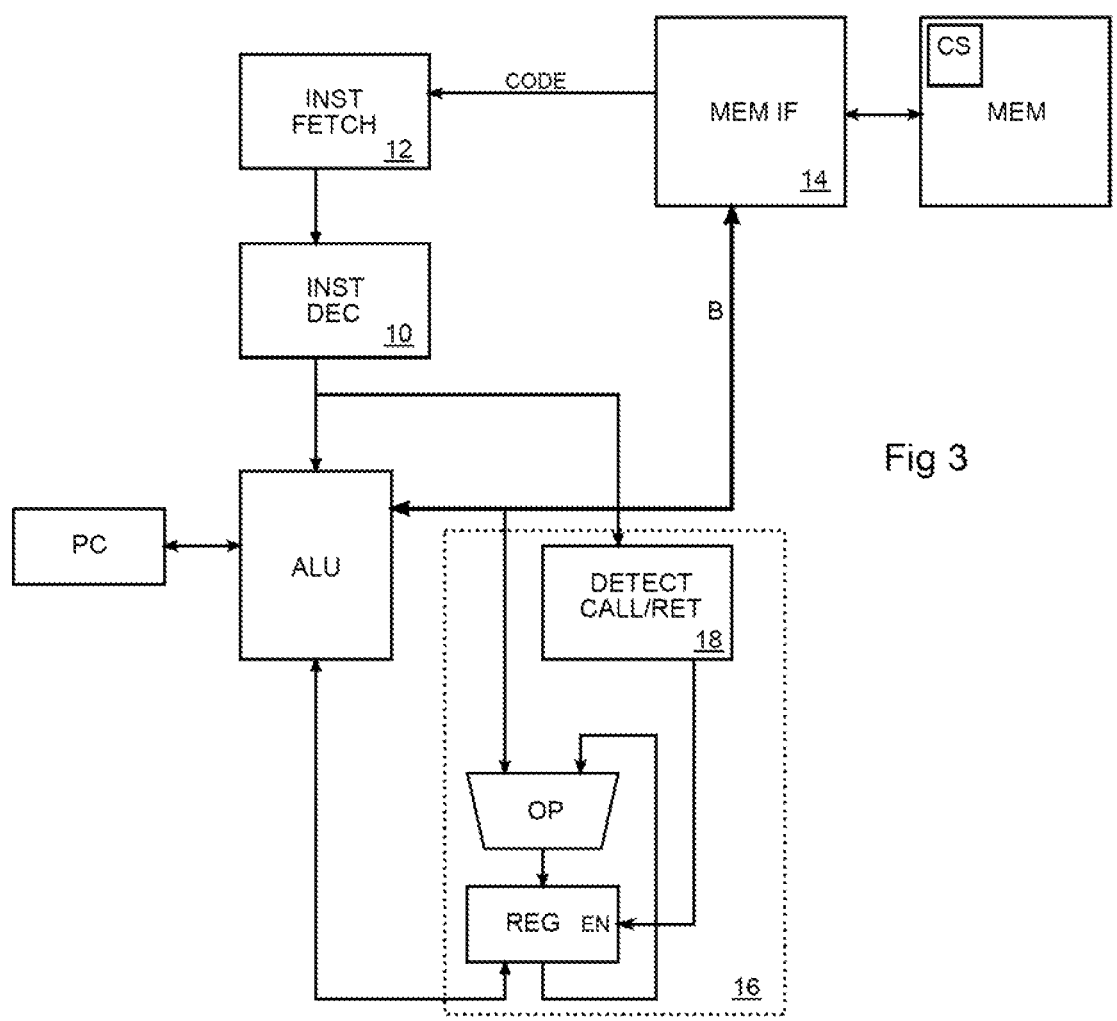
FIG. 3 shows an embodiment of a call stack change detection device.

FIG. 3 schematically shows an embodiment of a verification device associated with a processor. The processor may include an arithmetic and logic unit ALU that is controlled by an instruction decoder 10. The decoder 10 may receive instruction codes through an instruction fetch unit 12. A memory interface 14 may be provided for reading the instruction codes for unit 12 in a central memory MEM. The current instruction to fetch in memory may be identified by the address contained in a dedicated register called "program counter" or PC, address that the ALU unit communicates to the memory interface 14 through a bus B. The bus B may be used moreover for exchanging data between the ALU unit and memory MEM.

The subroutine call stack CS may be embodied in a reserved area of the memory MEM. The data it stores are addresses that may point to an area of memory MEM containing instructions of the program to execute.

A subroutine call is operated by executing a CALL instruction in the ALU unit. The ALU unit calculates the return address and pushes it on the stack. The return address is usually the address of the instruction immediately following the call, and it is defined, for example, by adding a fixed offset to the current value of the program counter PC. Moreover, the CALL instruction may convey as a parameter the address of the first instruction of the subroutine—the ALU unit may then update the program counter PC with this address.

A subroutine return may be operated by the execution of a RET instruction. The ALU unit then pops the last address from the stack and updates the program counter PC with this address.

It will be noted that the address pushed on the stack upon execution of the CALL instruction and the address popped from the stack upon execution of the RET instruction are present in turn on the data lines of bus B, in a write transaction for the first and a read transaction for the second.

The verification device 16 may include a register REG configured for accumulating these addresses that are pushed on, and popped from the call stack. The accumulation is performed using an operator OP, preferably configured to calculate a bitwise exclusive-OR between the content of the register REG and the value present on the data lines of bus B.

A detection circuit 18 may be provided to identify whether the current instruction is a subroutine call or return. It receives for this purpose the instruction code available in the instruction decoder 10. Each time that such an instruction is detected, the circuit 18 enables (EN) an accumulation in the register REG. If reciprocal operations other than exclusive-OR are used for the accumulation, the circuit 18 may also select the operation depending on whether the instruction is a call or a return.

The content of the register REG may be writable and readable through the ALU unit, like the contents of working registers typically provided in a processor. The register REG thus becomes accessible by program instructions.

Many variations and modifications of the described embodiments will occur to those skilled in the art. Although a specific software/hardware partitioning was disclosed for implementing the desired functionality, it is clear that other partitioning schemes are possible depending on the desired compromise between speed and silicon surface area. The terminology "subroutine" or "function" used in this disclosure is intended to be generic and applies to any program section that is executed by a jump and return mechanism using a stack for storing the return addresses.

What is claimed is:

1. A method for detecting a subroutine call stack modification, comprising:
   for each subroutine in a sequence of subroutines nested in an initial subroutine:
      when calling a current subroutine, placing a return address at the top of the stack;
      at an end of the current subroutine, using an address at the top of the stack as the return address, and removing the address from the stack;
   assigning a single memory location to the sequence of subroutines;
   saving an initial value of the single memory location before calling the initial subroutine;
   when calling the current subroutine, accumulating the return address in the single memory location using a first operation;
   at an end of the current subroutine, accumulating the address from the top of the stack in the single memory location using a second operation, wherein the second operation is reciprocal of the first operation; and
   upon returning from the initial subroutine, detecting a subroutine call stack modification when the content of the single memory location differs from the initial value.

2. The method of claim 1, wherein the first and second operations are a bitwise exclusive-OR.

3. The method according to claim 2, wherein the initial value is random.

4. The method of claim 1, wherein the first and second operations are addition and subtraction.

5. The method according to claim 4, wherein the initial value is random.

6. The method according to claim 1, wherein the return address and the address at the top of the stack are values taken from a memory bus during access transactions to the stack.

7. The method according to claim 6, wherein the initial value is random.

8. The method according to claim 1, wherein the initial value is random.

9. A device for detecting a subroutine call stack modification, comprising:
   a processor configured to:
      store at a memory location an initial value;
   an operator circuit configured to:
   replace a current value of the memory location with a result of an operation between the content of the memory location and the current value exchanged with a call stack; and
   a detection circuit configured to identify a currently executed instruction and:
      if the identified instruction is a subroutine call, configuring the operator circuit to perform a first type of operation, and
      if the identified instruction is a subroutine return, configuring the operator circuit to perform a second type of operation that is a reciprocal operation of the first type of operation, wherein the processor is further configured to determine if the content of the first memory location differs from the initial value, and if so, detect a subroutine call stack modification.

10. The device according to claim 9, wherein the first and second types of operation are an exclusive-OR operation.

11. The device according to claim 9, wherein the first and second types of operation are addition and subtraction.

12. A method for detecting a subroutine call stack modification, comprising:
  (A) assigning a single memory location or register dedicated to a sequence of subroutines;
  (B) storing an initial value to the single memory location or register before calling any subroutine of the sequence of subroutines;
  (C) for each subroutine in the sequence of subroutines:
    (i) placing a return address of the subroutine at the top of a stack;
    (ii) calculating an accumulation value using a first accumulating operation performed between the content of the single memory location or register and the return address of the subroutine;
    (iii) updating the content of the single memory location or register with the calculated accumulation value;
    (iv) calling any nested subroutines in the subroutine; and
    (v) when the subroutine ends or a return instruction is received:
      calculating a de-accumulation value using a de-accumulating operation that is reciprocal of the first operation and that is performed between the content of the single memory location or register and the current address at the top of the stack; and
      continuing execution from the address at the top of the stack/using an address at the top of the stack as the return address, and removing the address from the stack;
  (D) determining whether the content of the single memory location or register differs from the initial value; and
  (E) if the content of the single memory location or register differs from the initial value, transmit or store an indication that a subroutine call stack modification has been detected.

13. The method of claim 12, wherein the first and second operations are a bitwise exclusive-OR.

14. The method of claim 13, wherein the first and second operations are addition and subtraction.

15. The method according to claim 14, wherein the return address and the address at the top of the stack are values taken from a memory bus during access transactions to the stack.

16. The method according to claim 15, wherein the initial value is random.

* * * * *